Aug. 4, 1964 H. D. HERN 3,143,710

PEAK-TO-R.M.S. NOISE EXPANDER UTILIZING INVERSE PARALLEL CONNECTED DIODES

Filed Oct. 3, 1960 2 Sheets-Sheet 1

INVENTOR.
HOWARD D. HERN
BY Moody and Goldman
ATTORNEYS

INVENTOR.
HOWARD D. HERN
BY Moody and Goldman
ATTORNEYS 3,143,710

PEAK-TO-R.M.S. NOISE EXPANDER UTILIZING INVERSE PARALLEL CONNECTED DIODES

Howard D. Hern, Richardson, Tex., assignor to Collins Radio Company, Cedar Rapids, Iowa, a corporation of Iowa Filed Oct. 3, 1960, Ser. No. 60,076

3 Claims. (Cl. 328—142)

This invention relates to means for controlling a characteristic of noise commonly referred to as its peak-to-root-mean-square (R.M.S.) voltage ratio.

The amplitude of noise peaks may be defined as a voltage which is exceeded by a noise wave less than .01% of the time. Its R.M.S. voltage, however, is the square root of a total noise power divided by the time during which it was totalized; wherein the measuring time is very long compared to the period of the lowest important frequency component in the noise. White (Gaussian distribution) noise, as obtained from available noise generators, has approximately a peak-to-R.M.S. voltage ratio of 12 decibels.

Noise voltages have varying usages in the electronic arts. One important use is to determine intermodulation distortion in electronic equipment used for handling voice signals. Intermodulation distortion within an electronic equipment may be due to nonlinearities in some of its components. For example, a large number of frequency multiplexed voice signals may have a large peak-to-R.M.S. ratio, such as 24 decibels. Thus, the composite voice signals can instantaneously combine to cause peaks that drive amplifiers in an electronic equipment into saturated conditions which cause clipping of the peaks. The economy of electronic equipment generally requires that signal loading be provided at as high an average power level (R.M.S.) as is possible. But as the average R.M.S. level is increased, the distortion increases; since the dynamic range of all amplifiers and other electronic equipment is limited. A precise measurement of distortion can permit a frequency-multiplexed (multichannel) electronic system to be operated at maximum efficiency for a given performance criteria. See B. D. Holbrook, J. T. Dixon, "Load Rating Theory for Multichannel Amplifiers," Bell System Tech. Journal, vol. XVIII, pp. 624–644, October 1939.

A conventional procedure for measuring intermodulation distortion of voice-handling frequency-multiplexed electronic equipment is to simulate the multiplexed voices by a noise voltage. The noise is filtered to a bandwidth somewhat less than that of the equipment when applied to the equipment input; so that a small percentage of equipment bandwidth exists above and/or below the input noise band. The R.M.S. noise output of the equipment in its bandwidth outside of the input noise band is dependent upon the intermodulation distortion produced by the equipment due to the input noise spectra. The intermodulation distortion may be measured at least two ways using at least two filters connected to the output of the equipment. All of the filters have their bandpasses within the over-all bandwidth of the equipment; but only one output filter has a bandpass within the input noise bandwidth. The second (and/or third) filter has a bandpass above (and/or below) the input noise bandwidth but within the equipment bandpass. Hence, the amount of noise power existing in the limited bandpass of the second (and/or third) filter is a function of the intermodulation distortion of the equipment. If there is no intermodulation distortion, the only output frequencies will be the input frequencies and none will pass through the second or third filters. However, if intermodulation distortion does exist, new frequencies will be generated which will pass through the second (and third) filters with a power dependent upon the degree of intermodulation distortion. The R.M.S. voltage output from each of the filters is measured. The measured noise power from the first filter provides a reference level for evaluating the distortion power outputs of the second (and third) filters. The value of intermodulation distortion is determined by a ratio of the second (or third) filter R.M.S. output to the first filter R.M.S. output. The largest ratio is generally accepted as the distortion measurement.

Conventional techniques using ordinary noise-generator voltages that have a 12 decibel peak-to-R.M.S. noise ratio are fairly accurate for equipment with a bandwidth for a single voice channel, but it becomes increasingly inaccurate as the bandwidth is increased for an increasing number of voice channels.

Consequently, when an ordinary noise voltage with a 12 decibel ratio is used to test intermodulation distortion for a frequency-multiplexed equipment, the results of the test do not directly provide a measure of intermodulation distortion. Consequently, a correction factor must be applied to the distortion measurement for multiplexed equipment, in order to determine actual intermodulation distortion. The proper computation of the correction factor is complex and involves some assumptions.

The correction factor and resulting complications are eliminated from the test procedure by using this invention to provide a peak-to-R.M.S. noise voltage which can precisely simulate the peak-to-R.M.S. conditions of signals normally used by an equipment.

It is therefore an object of this invention to provide means for controlling the peak-to-R.M.S. ratio of a white or Gaussian distributed noise voltage.

It is another object of this invention to expand the peak-to-R.M.S. voltage ratio obtained from available white or Gaussian noise generators from 12 decibels to that required to simulate multiplexed voice signals.

It is a further object of this invention to control the peak-to-R.M.S. ratio of a noise voltage to obtain a simplified intermodulation-distortion measurement of electronic equipment.

The invention expands the peak-to-R.M.S. ratio of a noise voltage by applying it to a symmetrical non-linear characteristic of an electron control device, which has the characteristic of decreasing resistance with increasing input amplitude. A pair of diodes, oppositely polarized and operated in nonlinear regions near zero current, have been found particularly useful in constructing the invention. Plural stages of such diodes have been connected in tandem in order to obtain as much expansion for the peak-to-R.M.S. ratio as required. Expansion by adding stages is incremental; and a fine adjustment of the ratio is obtained by controlling the input amplitude in regard to placement of the noise signal on the non-linear characteristic of the electron-control devices, or by controlling a clipping bias on electron-control devices in one or more of the stages.

Further objects, features and advantages of this invention will become apparent to one skilled in the art upon further study of the specification and the accompanying drawings, in which:

FIGURE 1 provides an embodiment of the invention;

The drawings will now be considered for a more detailed consideration of particular forms of the invention.

Figure 1:
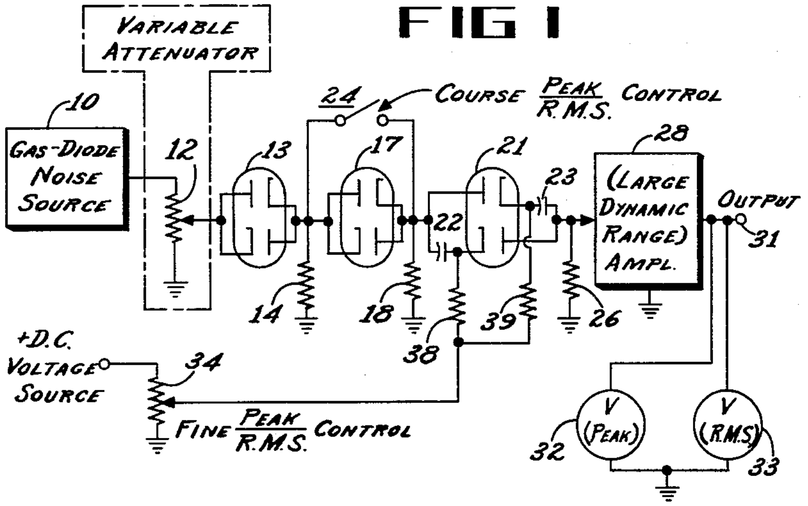

In FIGURE 1 a gas diode noise source 10 represents a conventional noise generator, which provides a peak-to-R.M.S. output ratio of about 12 decibels. A variable attenuator 12, which is a potentiometer, passes the output of noise source 10 at a controlled level.

A pair of diodes 13, which might be a 6AL5 vacuum tube, has a plate of one and a cathode of the other connected to a tap of potentiometer 12. A resistor 14 has one end grounded and has its other end connected to the remaining plate and cathode of diodes 13.

A second stage of the invention is provided by a second pair of diodes 17, which are connected in the same manner as diodes 13. Thus, the noise voltage provided by the first stage across resistor 14 is transferred through a plate of one and a cathode of the other of diodes 17. The remaining plate and cathode of diodes 17 are connected to one end of a resistor 18, which has its other end grounded. The ratio-expanded noise voltage of the second stage is provided across resistor 18. The noise voltage across resistor 18 is provided through oppositely polarized diodes 21 to a load resistor 26, although the voltage is passed through direct-current blocking capacitors 22 and 23.

The cathodes of the respective diodes 21 are connected to a variable-voltage source through isolation resistors 38 and 39. The source is obtained from the tap of a high-resistance potentiometer 34 connected between ground and a positive direct-current source. Thus, the adjustment of the potentiometer tap controls a symmetrical-bias voltage upon diodes 21.

A switch 24 is provided across diode 17; and when it is closed, one noise-expander stage is by-passed. Switch 24 therefore provides a coarse control over the output peak-to-R.M.S. ratio.

Am amplifier 28 has an input connected across resistor 26 to receive the ratio-expanded noise voltage. Amplifier 28 has a very large dynamic range, compatible with the dynamic range of the expanded noise voltage, so that it does not clip the noise peaks. Amplifier 28 might be a cathode follower.

Output terminal 31 is the output of amplifier 28, and it provides the expanded-ratio noise voltage from the illustrated embodiment of the invention.

A pair of voltmeters 32 and 33 are connected between output terminal 31 and ground. Voltmeter 32 is a peak-reading voltmeter, or may be an oscilloscope which measures the noise peaks. Voltmeter 33 measures the true R.M.S. level of the noise. Thus, the ratio of the readings of voltmeters 32 and 33 provides the output peak-to-R.M.S. voltage ratio for FIGURE 1.

Figure 2:
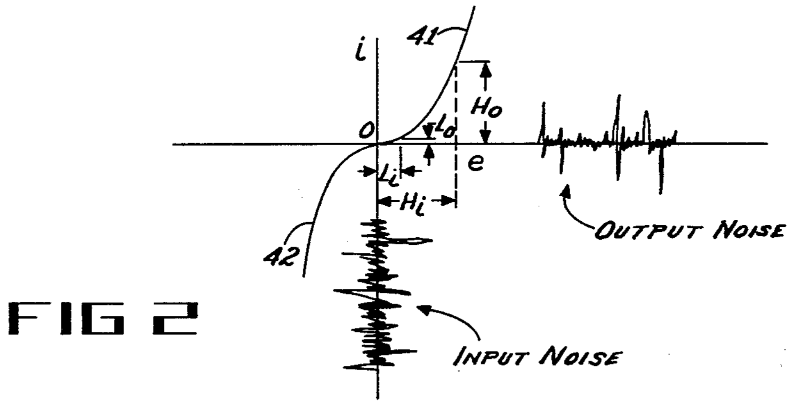
FIGURE 2 illustrates the non-linear characteristic of one stage in FIGURE 1.

FIGURE 2 shows a symmetrical non-linear conduction characteristic for the diodes in any one stage of FIGURE 1, such as for diodes 13. The voltage $(e)$ versus current $(i)$ curve 41–42 represents the non-linear transfer response of the respective diodes of a pair. The desired noise characteristic is obtained when the input voltage is operated at low levels about the curved non-linear portions of the curve near zero level; wherein resistance of the diodes decrease with increased input current to the diodes. This is opposite to the response of the diodes when they are driven into their saturated regions.

It can be realized from FIGURE 2 that the lowest amplitude parts of the input noise meet greater resistance than the higher amplitude parts; and therefore the lower amplitudes are attenuated more than the higher amplitudes. Since most of the power of a noise voltage having Gaussian distribution lies in its low amplitude components, these are attenuated most to reduce the average power of the noise voltage without a corresponding reduction in its peaks. An expansion of the peak-to-R.M.S. noise ratio results.

An illustration of the ratio expansion is obtained in FIGURE 2 by considering an input noise peak having a low amplitude, $L_i$, and another input noise peak having a high amplitude, $H_i$. It can be seen that amplitude $L_i$ results in a much smaller output amplitude $L_o$; while on the other hand, it can also be seen that amplitude $H_i$ results in approximately the same output amplitude $H_o$. Thus, the ratio $H_o/L_o$ will be greater than the ratio $H_i/L_i$. Since more energy is in amplitudes near $L_i$ than near $H_i$, it is apparent that the output peak-to-R.M.S. ratio has increased.

It can also be visualized from FIGURE 2 that some control over the peak-to-R.M.S. output ratio can be obtained by adjustment of the level of the input noise to different parts of curve 41–42, such as by adjustment of variable attenuator 12. As the attenuator is adjusted to increase its output noise voltage, the peak-to-R.M.S. ratio tends to increase until most of the noise moves into the more linear portions of curves 41 and 42; and further voltage increases decrease the ratio. Accordingly, the output ratio reaches a practical maximum after the input level reaches a given high level.

Figure 3:
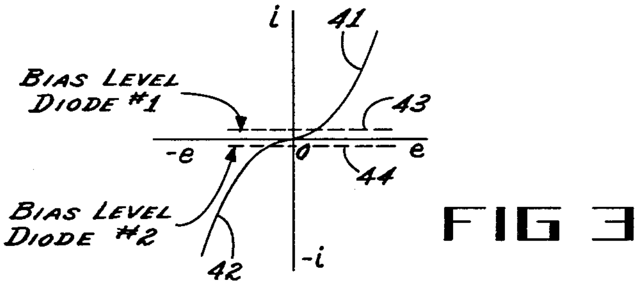
FIGURE 3 shows a bias added to the non-linear characteristic of FIGURE 2.

Another type of fine adjustment can be obtained by controlling bias potentiometer 34 in FIGURE 1. The operation of the bias control can be better understood by reference to FIGURE 3. The bias levels for the two diodes 21 are illustrated in FIGURE 3; wherein the pair of diodes is referenced as diode #1 and diode #2. When the bias level is set to a particular value, that portion of the noise voltage existing between the bias level in dashed lines in FIGURE 3 is removed from the noise output of the stage. Since most of the energy of the noise signal lies adjacent to its zero voltage level, a bias level increase will have the effect of reducing the average power of the noise signal without correspondingly reducing the high peaks of the noise for relatively small bias levels. Hence, the effect of increasing the bias, within limits, is to increase the peak-to-R.M.S. output ratio of the noise.

Figure 4:
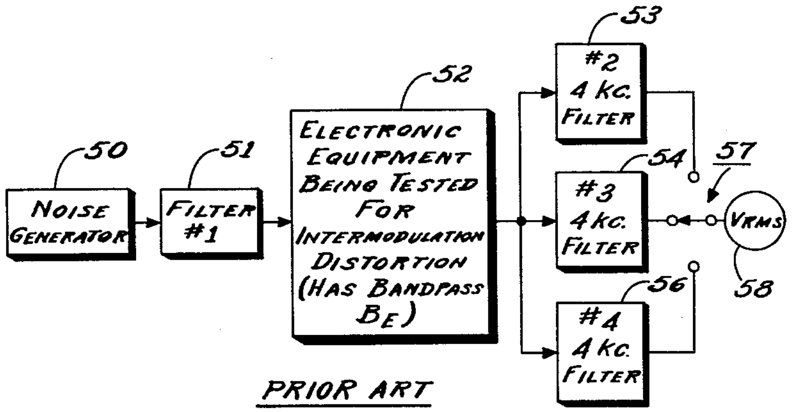
FIGURE 4 illustrates a conventional intermodulation-distortion measuring arrangement which can have its procedure simplified by the invention.

FIGURE 4 illustrates a known system for measuring intermodulation disortion, which can be modified to use this invention. The system of FIGURE 4 measures the intermodulation disortion for an electronic equipment 52, which, for example, might be a broadband multiplexed equipment of the frequency-modulated type. Equipment 52 has a broad bandpass illustrated by response 61 in FIGURE 5(A).

A filter 51 is connected between the output of noise generator 50 and an input of electronic equipment 52. Filter 51 has the bandpass illustrated in FIGURE 5(A), which is narrower than bandpass 61 of electronic equipment 52. Also, filter 51 has sharp cutoffs on opposite sides of its bandpass characteristics. Accordingly, electronic equipment 52 receives a spectra of noise which occupies part, but not all, of its bandpass.

Figure 5:
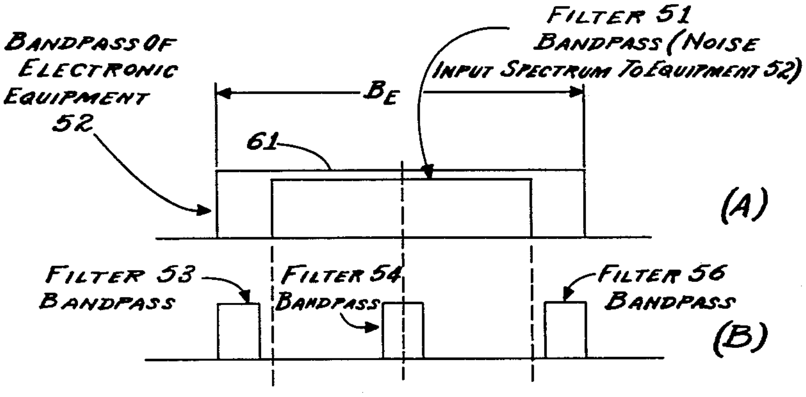
FIGURE 5 represents bandpass characteristics of filters used in FIGURE 4.

Three filters 53, 54, and 56 are connected to the output of equipment 52, and they have the bandpasses illustrated in FIGURE 5(B), which are all within the bandpass 61 of equipment 52. Thus, filter 53 has a bandpass below the input noise spectrum provided to equipment 52; while filter 54 has a bandpass above the input noise spectrum. The bandpass of filter 53 may be anywhere within the input noise spectrum and is shown centered with it.

A three-position single-pole switch 57 has respective stator contacts connected to filters 53, 54, and 56, respectively. A voltmeter 58 which can measure the root-mean-square (R.M.S.) voltage of non-sinusoidal waves has an input connected to the pole of switch 57. Voltmeter 58 may be a bolometer. Readings are taken from voltmeter 58 for each of its three positions. The center-position reading is proportional to the amplified noise input power. However, the readings taken from filters 53 and 56 represent the power of spectra generated by the intermodulation distortion within equipment 52, since their frequencies were not present at the equipment input. Two ratios are obtained as figures of merit of the intermodulation distortion occurring within equipment 52. One ratio is the R.M.S. output of bandpass filter 53 divided by the R.M.S. output of filter 54. The other ratio is the ratio of the R.M.S. output of filter 56 to the R.M.S. output of filter 54. The highest of the two ratios represents the worst case, and is taken to represent the intermodulation distortion of the equipment.

When noise generator 50 is conventional, it provides a noise output having a peak-to-R.M.S. ratio of about 12 decibels. However, if equipment 52 handles a large number of voice channels simultaneously, they may have a much higher peak-to-R.M.S. ratio, such as about 24 decibels for 12 channels. Then the noise peaks from the conventional noise generator will not be as high as will be found with the voice signals. A complicated correction computation is needed to interpret the results from the 12 decibel noise test before it can represent the intermodulation-distortion of the voice signals in the multiplex equipment.

Figure 6:
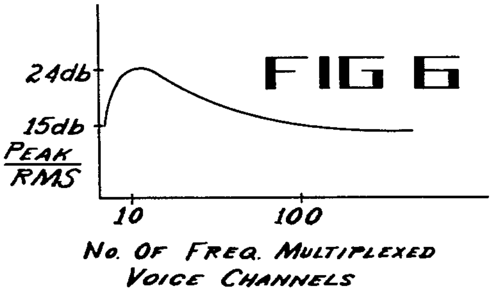
FIGURE 6 shows variation in peak-to-R.M.S. ratio as the number of voice channels is varied in a frequency multiplexed system.

When the invention is substituted for noise generator 50, its output noise ratio can be adjusted to a value equal to the peak-to-R.M.S. ratio of the multiplexed voice signals. Then the R.M.S. filter output ratios defined above are *directly representative* of the intermodulation distortion caused by the voice signals, *and no correction factors are needed*. Thus, complex computations and tables can be avoided by using the invention. The only computation or prior determination needed to apply the invention is a determination of the peak-to-R.M.S. ratio of the multiplexed voice signals. FIGURE 6 is illustrative of the determination.

Although this invention has been described with respect to a particular embodiment thereof, it is not to be so limited, as changes and modifications may be made therein which are within the spirit and scope of the invention as defined by the appended claims.

I claim:

1. A noise ratio expander for increasing the peak-to-root-mean-square ratio of an input noise source having a Gaussian distribution whereby the greater portion of power lies in the low amplitude components thereof, comprising, a plurality of dual-diode stages connected in tandem, each dual-diode stage including a pair of diodes connected with opposite polarity between inputs and outputs of a respective stage, each diode having adjacent its zero conduction region a nonlinear resistance characteristic of decreasing resistance with increasing input level, said noise source being of a predetermined level whereby the low amplitude components thereof lie substantially in said nonlinear characteristic with the high amplitude peaks thereof being outside said region in one of substantial linearity, and switching means for bypassing at least one of said stages to provide a coarse control over the peak-to-root-mean-square ratio of an output noise from a last of said stages.

2. A noise ratio expander as defined in claim 1 further comprising variable attenuator means connected between said noise source and said diodes by which the amplitude of said low amplitude noise components may be adjusted within said nonlinear region to provide a fine control of a peak-to-root-mean-square ratio of said output noise.

3. A noise ratio expander as defined in claim 1 including variable bias control means connected to said diodes the adjustment of which varies the average power of said output noise without substantial reduction in the high amplitude peaks thereof to obtain a fine control of the peak-to-root-mean-square ratio of said output noise.

References Cited in the file of this patent

UNITED STATES PATENTS

| | | |
|---|---|---|
| 2,612,630 | Greenleaf | Sept. 30, 1952 |
| 2,760,008 | Schade | Aug. 21, 1956 |
| 2,817,715 | Blake | Dec. 24, 1957 |
| 3,086,166 | Salvatori | Apr. 16, 1963 |